3,109,835
PROCESS FOR PRODUCING ULTRAHIGH VISCOSITY POLYCAPROLACTAM
Basil G. Apostle, Richmond, Patrick V. Papero, Jr., Hopewell, and Orvill E. Snider, Petersburg, Va., assignors to Allied Chemical Corporation, New York, N.Y., a corporation of New York
No Drawing. Filed Oct. 8, 1958, Ser. No. 765,946
2 Claims. (Cl. 260—78)

This invention relates to production of an ultrahigh viscosity polymer of epsilon-caprolactam which polymer retains ultrahigh viscosity upon being worked in a melt extruder.

Epsilon-caprolactam, hereinafter generally called "caprolactam," forms molding grade polymers which are useful for extrusion molding of small objects. These known molding grade polymers have relative formic acid viscosities of the order of about 50. "Relative formic acid viscosities" are determined in accordance with ASTM Test No. D-789-53T of the American Society for Testing Materials using a solution of 11 grams of polymer per 100 ml. of aqueous 90% formic acid. Polymers with relative formic acid viscosities of the order of 50 have reduced viscosities in metacresol solvent at 0.5 weight percent concentration and 25° C. of about 1.8, corresponding to molecular weights by the Staudinger equation of about 25,000. Melt viscosities of these polymers at 260° C. are about 3000 poises.

For molding and extrusion of relatively large objects such as pipe of diameter one inch and above, and for uses such as blow-molding of bottles, an ultrahigh viscosity polymer is desirable, namely a polymer having relative formic acid viscosity of at least about 200 and melt viscosity of at least about 6000 poises at 260° C. Proposals have been made to obtain ultrahigh viscosity caprolactam polymer by heating caprolactam polymer of ordinary viscosity, having amino and carboxyl end groups available for the desired further polymerization, in presence of small quantities of mineral acid catalysts such as, especially, phosphoric acid. It has been proposed that this heating be in the solid state or in the melt under high vacuum such as 1 mm. of mercury. Such processes tend to be inconvenient and/or slow. Moreover because at least traces of mineral acid remain in the final washed and dried polymer product, the final polymer product is subject upon reheating to a catalytically accelerated regeneration of low molecular weight fractions, e.g. the water-soluble monomer and low polymers previously removed by the water washing. Consequently a considerable drop in viscosity results as the final polymer product of such processes is reheated for molding or extrusion purposes.

We have now discovered a process for production of ultrahigh viscosity caprolactam polymers which process is carried out with the polymer in the molten state and without use of vacuum; which proceeds at commercially satisfactory rates; and which forms polymers of excellent heat stability, free of catalysts capable of accelerating thermal regeneration of low molecular weight fractions.

Our process consists essentially of passing an atmosphere of dry inert gas at a rate of at least 2 volumes of gas, measured at standard temperature and pressure conditions, per volume of reaction mixture per hour, over the surface of a reaction mixture of epsilon-caprolactam polymer, and at a gas flow rate in the range between about 20 and about 50 cubic feet (STP) per hour per square foot of reaction mixture surface exposed to the gas. The polymer has end groups available for further polymerization to relative formic acid viscosity of at least 200, any non-polymerizable material dissolved in said reaction mixture being non-acidic; the whole body of said reaction mixture including all surfaces being maintained at temperatures in the range between about 240° C. and about 275° C. and being subjected to smooth, thorough stirring.

Suitable polymer reaction mixtures for treatment by our process can be obtained by polymerizing caprolactam monomer free of inorganic acidic contamination in presence of a caprolactam polymerization accelerator, such as water, which volatilizes from the reaction mixture at or below polymerization temperatures and/or a caprolactam polymerization accelerator which itself copolymerizes with caprolactam, especially an aminocarboxylic acid such as epsilon-aminocaproic acid, 4-aminocyclohexylene acetic acid etc. It is important for our purposes that the cited reaction mixture be free of dissolved non-polymerizable materials such as inorganic acids, at least at the time the polymerization to relative formic acid viscosity of about 50 is complete, since we have found any quantities larger than traces of such acidic materials tend to prolong or even to prevent the desired subsequent increase of polymer viscosity at melt temperatures; and even in trace quantities such as for example 0.05% by weight, such acidic materials will undesirably accelerate depolymerization of the final polymer product upon working it in a melt extruder. However, non-polymerizable inorganic materials of neutral reaction can be present if desired, such as fillers, pigments, dyes, etc.

Materials of basic reaction desirably are present in small amounts, so long as the amount present will not unduly limit the availability of acidic end groups in the polymer, needed for polymerization to the desired degree. The degree of polymerization needed to produce the viscosities obtained in our process is of the order of 300–500 caprolactam monomer units per polymer chain, average. Accordingly the carboxyl and amino end groups rendered unavailable for further polymerization, by addition of mono-functional reactive bases or acid or the like, must each average not above about 1 gram-equivalent per 400 mols of caprolactam present in the polymer before treatment by our process. Suitable basic materials can be used in amounts of about 0.5–5 milli-equivalents per kilogram of reaction mixture. Suitable bases include inorganic bases such as sodium hydroxide, calcium hydroxide, dibasic and tribasic sodium phosphates, etc.; and tertiary nitrogen organic bases such as pyridine, quinoline, etc.

The usual methods of polymerization of caprolactam produce from the above reaction mixture a caprolactam polymer of relative formic acid viscosity up to about 50, e.g. heating aqueous 90%–99% caprolactam at 250°–255° C. for several hours in a closed vessel under autogenous pressure, then continuing the heating with agitation at about 255° C. and substantially atmospheric pressure for several more hours whereby the water is substantially completely driven off. Continued heating of the resulting polymer reaction mixture does not, however, carry the relative formic acid viscosity of the polymer thus obtained, water washed and dried, appreciably above 50.

We have found that when there is passed, over the upper surface of a smoothly and thoroughly stirred and adequately cooled melt of the above polymer of relative formic acid viscosity about 50, an atmosphere of dry inert gas at a critical rate, the polymer steadily increases in viscosity to values in the range 200–400 relative formic acid viscosity of the water washed, dried, final polymer product. The resulting final polymer product is free of catalysts of depolymerization and consequently has excellent stability to change of viscosity upon reheating.

The starting polymer of relative formic acid viscosity about 50 contains about 0.2–0.3% of water, we have found. Although we cannot fully explain all the principles underlying our process, we believe that our conditions promote intensive removal of the water remaining dissolved and/or combined in the polycaprolactam, which intensive water removal we believe to be necessary for establishing a favorable equilibrium, at the temperatures used in our process, between the desired high viscosity polymer and its hydrolysis products of lower viscosity.

The rate of passing inert dry gaseous atmosphere over our polymer reaction mixture, necessary to obtain the desired increase in polymer viscosity in accordance with our process, is at least 2 volumes of gas measured under standard conditions of temperature and pressure (0° C. and 760 mm. of mercury) per volume of reaction mixture per hour. Moreover, based on the exposed surface area of the reaction mixture contacting the gas, the gas flow must be in the range between about 20 and about 50 cubic feet per hour per square foot of the exposed surface. It will be appreciated that these flow rates indicate a maximum depth of the reaction mixture of about 10 feet.

The gas should be dry in the sense that its water vapor pressure should be well below that created at 260° C. by traces of water of the order of 0.1% by weight, dissolved in the polycaprolactam melt. A suitable gas contains not above about 1% by volume of water vapor; preferably to assure high efficiency the gas is dried over silica gel to water vapor content of at most about 0.1% by volume (dewpoint of $-20°$ C.).

It is important to stir the reaction mixture including the upper surface thereof so as to renew the exposed surface, we have found; but as the reaction mixture viscosity increases, the necessary stirring takes increasing mechanical power and consequently develops heat at increasing rates. Temperatures in the melt must not exceed about 275° C. since above that temperature high viscosity polymer tends to depolymerize and to develop color. But only moderate cooling, not below the polymer fusion point, is permissible since cooling below the fusion point will form a crust of solid polymer on the cooling surface, thus interfering with heat transfer and/or with the necessary renewal of the upper surface of the polymer.

We have found that if the whole body of polymer, including the surfaces thereof adjacent to cooling elements and including the exposed surface, is thoroughly and smoothly stirred, as by a continuously rotating anchor stirrer with close clearance from the cooled vessel walls, adequate agitation and adequate heat transfer can be maintained throughout our process. The adequacy of the stirring used can readily be judged by determining temperatures at representative points of the melt and by observation of the viscosity and exposed surface of the melt. With proper stirring the temperature throughout the melt including points adjacent to the cooled vessel walls and at the melt surface will remain in the range of about 240° C. to about 275° C. throughout the polymerization period and the upper surface will be continuously turned under and renewed. If the stirring is insufficiently thorough the rate of viscosity increase in the melt will be comparatively slow and temperatures measured in the melt adjacent to the cooling elements may be well below 240° C. while the temperature near the center of the body of melt is as high as 280° C. On the other hand when the stirring is thorough but too vigorous, the input of heat due to expenditure of mechanical energy will be too great for the cooling capacity of the apparatus, and the temperature throughout the reaction mixture will rise above 275° C. before the desired polymer viscosity has been attained. Moreover unduly vigorous stirring tends to create foam upon and in the polymer which tends to interfere with the necessary renewal of the polymer surface and to be inconvenient in subsequent handling.

In accordance with the foregoing, it will be appreciated that whereas the rate of passing the gas over the polymer is to be at least 2 volumes of gas STP per volume of reaction mixture per hour, nevertheless the rate must be limited to avoid chilling the polymer surface to a point where a crust forms thereon and interferes with smooth stirring of the surface. Accordingly it is desirable to provide a sizeable gas space above the polymer so that the necessary volume of gas can be supplied per hour at relatively long contact time, suitably at least about 3 seconds based on gas volume measured at standard conditions, corresponding to space velocity of gas over the polymer, measured at standard conditions, not above about 20 volumes per minute.

The example which follows describes completely a specific embodiment of our process illustrative of the best mode contemplated by us of carrying out our invention. While the example is illustrative of our invention, it is not intended that the invention be limited to all details of the example.

Into a 6 ft. diameter kettle, about 15 ft. high, there was charged 6000 lbs. of 99% aqueous caprolactam which filled the kettle to a depth of about 5 ft. The kettle was fitted with inlet and outlet for passing gas over the reaction mixture, and was equipped with an anchor stirrer which projected above the surface of the reaction mixture and which cleared the kettle walls by about ½ inch. The kettle was jacketed for heating or cooling fluid. The caprolactam was a highly purified material showing pH in aqueous 20% solution of about 5.7. About 0.3 lb. of sodium hydroxide was added in the form of a 40% aqueous solution. These operations were carried out under an atmosphere of inert gas. The inert gas used for this purpose and in subsequent steps described below was a nitrogen/carbon dioxide mixture containing not above 20 parts per million of molecular oxygen.

Agitation was started at a rate of 10 revolutions per minute and the reaction mixture was heated by heating liquid in the jacket at a rate of about 20° C. per hour to a temperature of 125° C. and then at a rate of about 12° C. per hour to a temperature of 175° C. while water was allowed to evaporate through a steam condenser which returned lactam monomer to the reaction mixture. Then the kettle was closed and heating was continued at about 10° C. per hour to a temperature of about 260° C. in the reaction mixture. The pressure in the kettle rose during this last heating period to about 10 lbs./sq. in. gauge. After about 2 hours at 260° C. and 60 p.s.i.g., the pressure was gradually released to about 0.1–0.3 p.s.i.g. over the course of about 2 hours.

Then an atmosphere of dry inert gas of dewpoint about $-40°$ C. was passed downward into the free space in the reaction kettle at a rate of about 1000 cu. ft./hr., measured at standard conditions, corresponding to a rate of about 12 volumes of gas per volume of polymer reaction mixture per hour and corresponding to a space velocity in the free space, based on gas volume at standard conditions, of about 4 per hour and gas flow of about 35 cu. ft. (STP) per hour per square foot of exposed surface of the reaction mixture. Agitation was continued at about 10 r.p.m. and the pressure was maintained at about 0.1–0.3 p.s.i.g. while the temperature rose gradually. The viscosity of the polymer reaction mixture could be determined from the power input required to maintain stirring at the rate of 10 r.p.m. At the start of this period of heating while passing an atmosphere of inert gas over the polymer, the polymer had relative formic acid viscosity (washed and dried) of about 50 and at the finish of this period it had relative formic acid viscosity before washing of about 250. During this heating period the fluid in the jacket of the kettle was maintained at about 225° C. to remove the heat of reaction and the heat produced by the stirring.

The temperature reached 275° C. after about 28 hours. The reaction mixture was allowed to stand about 2 hours to release bubbles. It was then extruded through a plurality of orifices in the bottom of the kettle into a water bath by applying a pressure of about 40-60 p.s.i.g. of the dry inert gas to the upper surface of the polymer. The rods thereby formed were chopped into pellets which were thoroughly washed with hot water, centrifuged, and dried.

The final polymer, washed and dried, thus produced had relative formic acid viscosity of 368. The percent moisture was 0.03 and the percent water extractable fraction remaining was about 2. The degree of polymerization shown by measurement of intrinsic viscosity was 332 caprolactam units per molecule, average; that shown by determination of acid end groups was 411 and by determination of amine end groups was 371. The weight average degree of polymerization shown by light scattering was 621.

The above polymer and other similarly produced polymers were tested for stability of their viscosity under conditions of working in a melt extruder. A 1½ inch extruder was used with a single orifice of about 0.07 inch diameter. The extruder was provided with 2 pumps giving a minimum dwell time of 4 minutes and average dwell time of 10 minutes with delivery rate of about 33 grams per minute at each pump position. The extruder pressure was maintained at 1500 p.s.i. and the pack pressures were about 5000-6000 p.s.i. The extrusion temperature was about 260° C. The extruded polymers were tested to determine their relative formic acid viscosity.

Under these conditions the polymers produced in accordance with the present invention were found to lose only about 20-30 units of relative formic acid viscosity whereas commercial polyamides of similar original relative formic acid viscosity lost under like conditions about 100 units of relative formic acid viscosity. Operation of the extruder allowed measuring the melt viscosity of the extruded polymers. For the polymers produced in accordance with the invention this was found to be about 7000-8000 poises in the polymer as extruded at 260° C. whereas for the commercial products the melt viscosity was found to be about 6000 poises or below in the polymer as extruded at 260° C.

It will be appreciated that the form of vessel employed may be varied and the appropriate rate of stirring will depend upon the ratios of cooling surface area available, and exposed area of polymer, to the bulk of polymer being processed. The process can be carried out either batchwise as described or continuously with the polymer in the form of a large agitated pool or a flowing agitated stream.

We claim:

1. A process for increasing the viscosity of epsilon-caprolactam polymers to produce polymers having relative formic acid viscosity of at least about 200, measured in aqueous 90% formic acid at 10% concentration and 25° C. as specified in ASTM Test No. D-789-53T, said viscosity remaining stable within 50 units during at least 10 minutes working in a melt extruder, which process consists essentially of passing an atmosphere of dry inert gas at a rate of at least 2 volumes of gas measured at standard temperature and pressure conditions per volume of reaction mixture per hour and at rate in the range between about 20 and about 50 cubic feet of gas (STP) per hour per square foot of exposed surface of the below defined reaction mixture, over the exposed surface of a reaction mixture of epsilon-caprolactam polymer which polymer has relative formic acid viscosity of at least about 50 and has end groups available for further polymerization to relative formic acid viscosity of at least 200; any non-polymerizable material dissolved in said reaction mixture being non-acidic; the whole body of said reaction mixture including all surfaces being maintained at temperatures in the range between about 240° C. and 275° C. and being subjected to smooth, thorough stirring until the relative formic acid viscosity thereof has risen to at least about 200.

2. Process as defined in claim 1 wherein the dry inert gas is at about atmospheric pressure and has a dewpoint not above about −20° C. and is passed through the free space over the polymer reaction mixture at a space velocity, based on gas volume under standard conditions, of not above about 20 volumes per minute.

References Cited in the file of this patent

UNITED STATES PATENTS

| 2,130,523 | Carothers | Sept. 20, 1938 |
| 2,557,808 | Walker | June 19, 1951 |
| 2,687,552 | Gabler | Aug. 31, 1954 |
| 2,719,776 | Kummel | Oct. 4, 1955 |
| 2,731,081 | Mayner | Jan. 17, 1956 |

FOREIGN PATENTS

| 614,625 | Great Britain | Dec. 20, 1948 |
| 775,888 | Great Britain | May 29, 1957 |
| 799,328 | Great Britain | Aug. 6, 1958 |
| 248,484 | Switzerland | Mar. 16, 1948 |

OTHER REFERENCES

Taylor: J. Am. Chem. Soc., vol. 69, pages 635–638 (March 1947).